United States Patent [19]
Asai

[11] Patent Number: 4,772,196
[45] Date of Patent: Sep. 20, 1988

[54] MOLDING APPARATUS FOR PRODUCING CENTRALLY-APERTURED DISCS

[75] Inventor: Ikuo Asai, Nagoya, Japan

[73] Assignee: Kabushiki Kaisha Meiki Seisakusho, Aichi, Japan

[21] Appl. No.: 948,223

[22] Filed: Dec. 30, 1986

[30] Foreign Application Priority Data

Feb. 26, 1986 [JP] Japan .................. 61-040538
Mar. 28, 1986 [JP] Japan .................. 61-070067

[51] Int. Cl.$^4$ .............. B29C 39/30; B29C 39/44; B29C 45/38
[52] U.S. Cl. .................. 425/155; 425/290; 425/577; 425/810
[58] Field of Search .......... 425/810, 290, 542, 310, 425/155, 156, 157, 577; 264/106, 107, 577, 556, 595

[56] References Cited

U.S. PATENT DOCUMENTS

| | | | |
|---|---|---|---|
| Re 31,235 | 5/1983 | McNeely et al. | 425/810 |
| 941,291 | 11/1909 | Wickes | 425/810 |
| 1,275,100 | 8/1968 | Steventon | 264/107 |
| 1,399,817 | 12/1921 | Steventon | 425/290 |
| 1,594,662 | 8/1926 | Cawley | 264/106 |
| 1,737,619 | 12/1929 | Smith | 264/106 |
| 1,915,357 | 6/1933 | Fernberg | 425/810 |
| 2,030,726 | 2/1936 | Strock et al. | 249/68 |
| 2,092,880 | 9/1937 | Hunter et al. | 425/810 |
| 2,584,892 | 2/1952 | Lord | 264/107 |
| 2,587,070 | 2/1952 | Spillman | 249/110 |
| 2,613,395 | 10/1952 | Massler | 264/106 |
| 2,642,621 | 6/1953 | Amo | 264/106 |
| 2,976,571 | 3/1961 | Moslo | 249/141 |
| 2,992,455 | 7/1961 | Salzman | 425/562 |
| 3,154,816 | 11/1964 | Harrison et al. | 249/90 |
| 3,397,425 | 8/1968 | Phillipson et al. | 425/139 |
| 3,442,990 | 5/1969 | Phillipson et al. | 425/385 |
| 3,897,929 | 8/1975 | Hartmann | 249/105 |
| 3,932,097 | 1/1976 | Press | 425/810 |
| 3,937,779 | 2/1976 | Simmons | 264/106 |
| 3,969,057 | 7/1976 | Pierre | 425/4 R |
| 3,986,805 | 10/1976 | Haines | 425/451 |
| 3,989,436 | 11/1976 | McNeely et al. | 425/572 |
| 4,085,178 | 4/1978 | McNeeley et al. | 264/106 |
| 4,140,470 | 2/1979 | Pasch et al. | 425/544 |
| 4,185,955 | 1/1980 | Holmes et al. | 264/106 |
| 4,198,037 | 4/1980 | Anderson | 264/248 |
| 4,251,479 | 2/1981 | Pecht et al. | 264/106 |
| 4,260,360 | 4/1981 | Holmes et al. | 249/79 |
| 4,285,659 | 8/1981 | Kolke | 425/542 |
| 4,302,175 | 11/1981 | McNeely | 425/810 |
| 4,304,806 | 12/1981 | Anderson et al. | 264/106 |
| 4,359,443 | 11/1982 | Michaels | 425/543 |
| 4,372,741 | 2/1983 | Cane et al. | 264/106 |
| 4,374,636 | 2/1983 | Holmes | 249/67 |
| 4,427,353 | 1/1984 | Omiya et al. | 425/810 |
| 4,439,128 | 3/1984 | Louik et al. | 425/290 |
| 4,466,934 | 8/1984 | Cane et al. | 264/161 |

FOREIGN PATENT DOCUMENTS

| | | |
|---|---|---|
| 778318 | 2/1968 | Canada . |
| PA115304 | 2/1952 | German Democratic Rep. . |
| 59-230731 | 12/1984 | Japan . |
| 7003886 | 9/1970 | Netherlands . |
| 453671 | 6/1968 | Switzerland . |
| 881736 | 11/1961 | United Kingdom . |
| 948476 | 2/1964 | United Kingdom . |
| 1301095 | 12/1972 | United Kingdom . |

Primary Examiner—Willard Hoag
Attorney, Agent, or Firm—Parkhurst & Oliff

[57] ABSTRACT

The present invention relates to an injection molding apparatus for producing video discs, compact discs, etc. Most particularly, the present invention provides an injection molding apparatus for producing the discs mentioned above in which when a punch severs an aperture in the disc while in the mold halves and not solidified, a sprue bushing is arranged to retreat while a resisting force is applied to the sprue bushing against the urging force of the punch.

8 Claims, 10 Drawing Sheets

MOLDING APPARATUS FOR PRODUCING CENTRALLY-APERTURED DISCS

BACKGROUND OF THE INVENTION

1. Field of Invention

This invention relates to improved molding apparatuses and more particularly molding apparatuses used for producing centrally-apertured discs (e.g., record discs, video disks, magnetic discs, optical discs and information recording discs). The molding apparatuses according to the present invention include non-compression and compression injection molding apparatuses.

2. Reference to Related Art

U.S. Pat. No. 4,085,178 relates to a method for producing injection molded and centrally apertured disc records. In this patent, after partial cooling of the heated injected material, the first and second mold halves move from the closed location to a location intermediate a closed location to an open location while the punch is locked in place to sever the sprue from the part along the peripheral surface of the punch end portion. Furthermore, the sprue bushing displaced opposing the punch is secured to a platen which is secured to a frame of an injection molding machine, so that the sprue bushing is arranged to be immovable. The application of U.S. Pat. No. 4,085,178 is a divisional application of Ser. No. 642,162 (now U.S. Pat. No, 3,989,436) and the machine used in the method of U.S. Pat. No. 4,085,178 has the same structure with that of the parent application.

In an injection molding machine described in U.S. Pat. No. 4,260,360 and U.S. Pat. No. 4,185,955, a punch is locked in place during which first and second mold halves held by a latching device move from the closed location to an intermediate location, at which position a sprue is fully severed from the part of disc by the peripheral surface of the punch end portion. In these patents, an immovable sprue bushing is provided.

Japanese Patent Laid-open No. 59-230,731 shows an injection molding machine having such a structure that when an aperture is formed at the center of a disc, only a sprue bushing is retreated, at a non-load state, with the advancement of a punch at a state that the mold halves are closed.

In centrally apertured discs such as record discs, magnetic discs, optical discs and information recording discs, particularly optical discs of this type, as conditions to obtain reproduction of clear image and high quality sound, it is required to have low birefringence and have no difference of birefringence between the outer and inner peripheries of the discs (i.e., have a uniform birefringence).

All of the above-listed related art have common structure such that no resistance is applied to a punch when a central aperture is severed by the punch. However, under such structures, a cutting face of the central aperture of the molded disc becomes coarse and the central portion of the molded disc is flexed at the time of the punching, so that residual stress is generated. Thus, there arises the problem that the accurate signal encoding range around the aperture is reduced.

The present invention is provided to solve the above-mentioned problems and improves the conditions required.

In the Japanese related art molding apparatus noted above, a punch is provided to form a central aperture in the molded disc, and the molded disc is punched to form the central aperture with advancement of the punch. This operation is shown in the time chart of FIG. 10. In the Figure, a line X1 shows an ordinary injection molding operation. As is shown, the operation consists of an injection step I, a cooling step II, a gas release by depressurization step III, a low speed mold opening step IV, a high speed mold opening step V, a low speed mold opening step VI, a product ejector pin advancement step VII and an ejector pin retreat step VIII, these steps being executed in the mentioned order.

Figure 10:
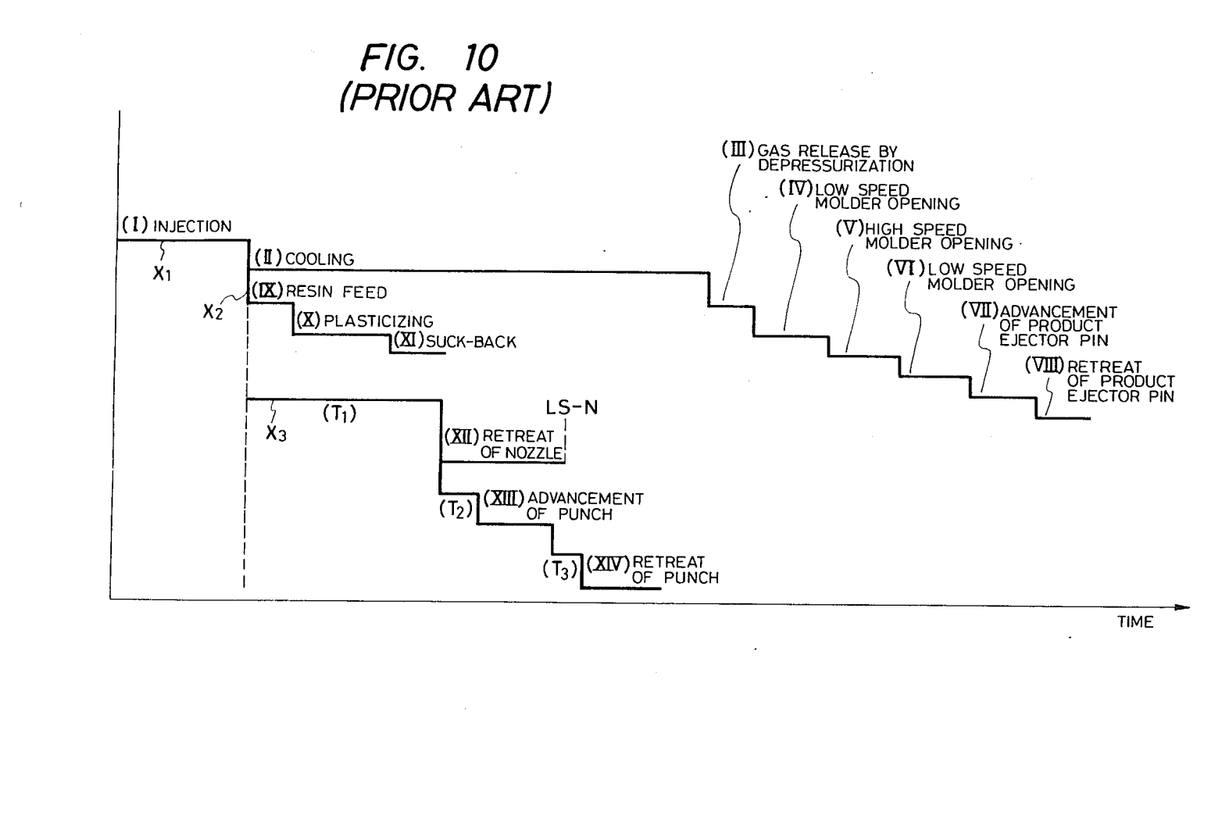
FIG. 10 is a time chart illustrating the operation of a related art injection molding apparatus.

Further, upon completion of the injection step I, a charging process is started with the start of rotation of a screw fitted in a heating cylinder, as shown by a line X2. As is shown, the charging process consists of a feed step IX of supplying resin to the heating cylinder, a plasticizing step X and a suck-back step XI. These steps are being executed in the mentioned order. After the resin has been cooled down, the contact force of a nozzle provided at the end of the heating cylinder with respect to a movable sprue bushing in the molder is reduced to zero, and the punch is advanced to punch the molded disc to form a central hole. The punch is retreated in co-operation with the nozzle. The time before the retreat of the nozzle is labeled T1 in line X3. Then, the nozzle retreat step XII is started. The punch advancement step XIII is started after the lapse of time T2 equal to 0.5 sec., and the punch retreat step XIV is started after the lapse of a predetermined period T3 of time. The nozzle is stopped when it strikes a limit switch LS-N.

In the above related art molding apparatus, the punch is advanced after the resin in the molder cavity has been solidified. At this time, the central portion of the molded disc in the molder cavity is hardened. Therefore, a coarse cutting surface results when the central aperture is formed by the punch. On addition, cutting dust generated at this time becomes attached to a mirror surface of the molder cavity and also to the stamper. This will lead to the formation of a defective molding due to introduction of the cutting dust into the molten resin injected at the time of the next injection.

SUMMARY OF THE INVENTION

The present invention relates to an improved molding apparatus used for a reciprocating injection molding machine or a reciprocating compression injection molding machine for manufacturing centrally-apertured discs such as record discs, video discs, compact discs, etc., and a method for producing centrally-apertured discs. The first object of the present invention is to provide a molding apparatus comprising a stationary base, a movable base which is provided so as to reciprocally move with respect to the stationary base, a stationary mold half fixed to the stationary base, a movable mold half fixed on the movable base, a cavity for forming a record disc which is defined between both mold halves, a stamper provided on the bottom of one of the mold halves defining the cavity, a sprue bushing provided movably within the stationary mold half and a passage communicating with the central portion of the cavity, through which passages molten resin may pass, a punch which is provided at a portion corresponding to the sprue bushing within the movable mold half which is reciprocally movable to go through the central portion of the cavity, and means for providing to the sprue bushing a force resisting the urging force of the punch when the sprue bushing retreats at the time when the punch punches the center of a molded disc in the cavity.

In the apparatus having the above-mentioned structure, the movable base is moved towarad the stationary base such that they are brought in contact with each other to be mold-clamped; then, the stationary mold half and the movable mold half define the cavity for forming a record disc between both the metal halves while leaving a gap for letting out air; molten resin is injected into the cavity from the nozzle through the sprue bushing; and when the injection of molten resin is completed, appropriate holding pressure is imparted to the molten resin in the cavity so that the resin can have said force, only for a predetermined period of time; and then, the central portion of the molded disc is punched by a punch which actuates toward the sprue bushing to which a force resisting the urging force of the punch is imparted by means for giving such resisting force; thus a record disc having a central aperture can be manufactured; whereby preventing the generation of residual stress and enlarging the signal recording range.

Another object of the present invention is to provide a method for manufacturing centrally-apertured discs by using an apparatus as mentioned above. The feature of said method is to contain a step in which at the time when the punch is advanced after the molten resin is injected, the sprue bushing is retreated while imparting resisting force to the punch.

Still another object of the present invention is to provide a molding apparatus on top of the structure of the above-mentioned apparatus, equipped with a timer for time counting the appropriate period of time before molten resin is solidified after the molten resin is injected, and for imparting a signal to actuate the punch after the preset time.

In the apparatus having the above-mentioned structure, the timer starts time counting at the same time when the injection is completed, after the completion of the time counting, the timer acts to appropriately switch off, whereby the punch starts the advancement, thus an aperture is made in a molded disc before the molten resin in the cavity is solidified. Thereby, ready and smooth punching is possible. Additionally, any generation of residual stress can be prevented and also cutting dust is not produced.

Still another object of the present invention is to provide a method for manufacturing discs having a central aperture by the above-mentioned apparatus.

The primary feature of said method is to contain a step that after molten resin is injected, a timer time-counts an appropriate period of time before the molten resin is solidified, and during this preset time, the punch provided oppositely to the cavity is moved forward to punch an aperture in the resin injected in the cavity, against a resisting force provided by the sprue bushing.

DESCRIPTION OF THE PREFERRED EMBODIMENTS

Figure 1:
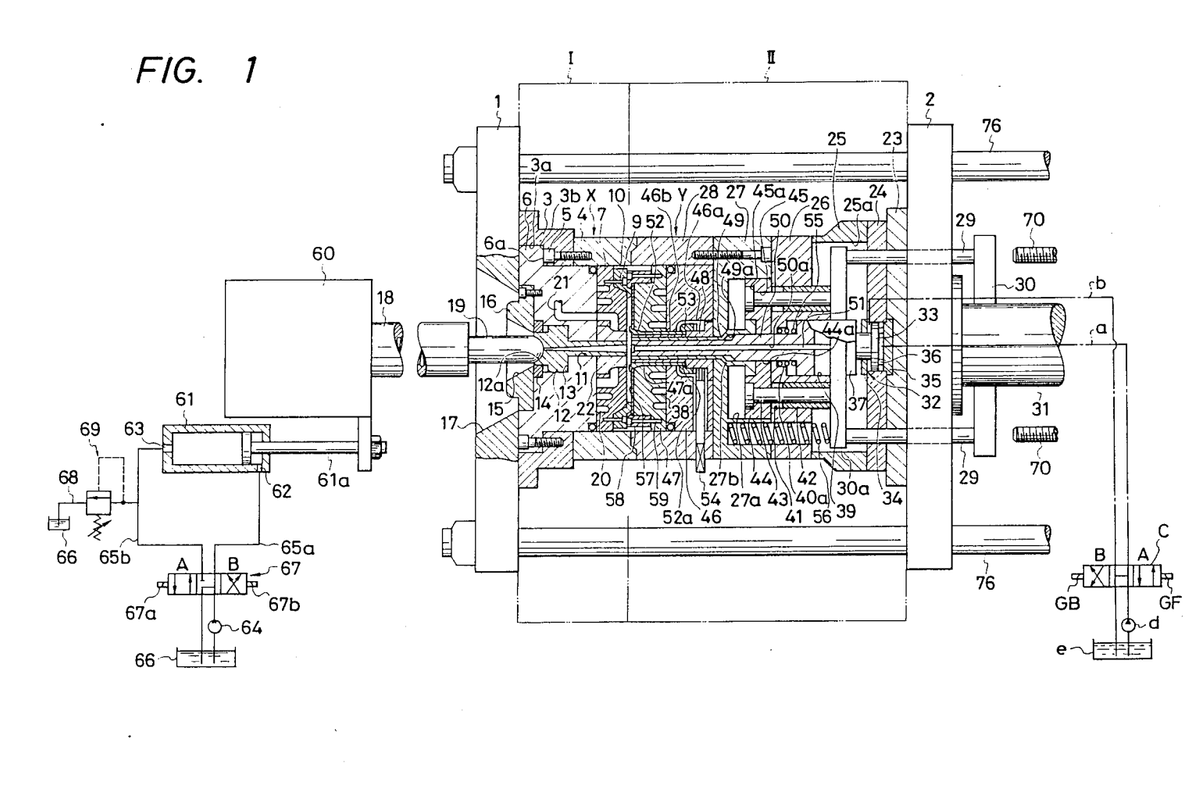
FIG. 1 is a sectional view showing an embodiment of the molding apparatus according to the invention.

An embodiment of the invention will now be described with reference to the drawings. FIG. 1 is a sectional view showing a molding apparatus in the state of mold clamping. Reference numeral 1 designates a stationary base, and numeral 2 a movable base. A stationary assembly I consisting of a plurality of elements is mounted on the stationary base I, and a movable assembly II consisting of a plurality of elements is mounted on the movable base 2.

The stationary assembly I and movable assembly II will now be described in the mentioned order. To one end surface of the stationary base 1 on the side of the movable base 2 is secured a stationary mounting member 3 having a bore 3a having a shoulder 3b. An end of an annular holding member 4 is mounted by a bolt 5 on an end of the stationary mounting member 3. A stationary insert member 6 having a shoulder 6a is inserted in the bore 3a of the stationary mounting member 3. The stationary insert member 6 has one end in contact with the stationary base 1 and the other end portion projecting from the bore 3a and fitted in a bore 4a of the stationary molding member 4. The stationary insert member 6 is retained against detachment by the engagement between shoulder 3b of the stationary mounting member 3 and shoulder 6a of the stationary insert member 6. A stationary mirror surface plate 7 is fitted in the bore 4a of the stationary holding member 4. The stationary mirror surface plate 7 has one end in contact with an end of the stationary insert member 6 and has a frustoconical central portion directed toward the movable base 2. The end of the frustoconical central portion may be provided with a stationary stamper, although not shown in the drawings. In this case, the stationary stamper is secured to the stationary mirror surface plate 7 by an outer ring 10 secured by bolts 9 along the inclined surface of the frustoconical portion. The inner periphery of the outer ring 10 defines the outer periphery of a gap between a movable stamper 57 to be described later and the stationary stamper, that is, it defines the outer periphery of a molding or molded disk formed in the gap noted above. The stationary holding member 4 and stationary mirror surface plate 7 constitute a stationary mold X as a first mold half.

Formed in a central portion of the stationary insert member 6 and stationary mirror surface plate 7 is a through bore 11 having a large diameter section and a small diameter section. The large diameter section is found in the stationary insert member 6. A sprue bushing 12 having a large diameter portion and a small diameter portion is slidably fitted in the through bore 11. In its large and small diameter portions are respectively received in the large and small diameter portions of the through bore 11. The length or axial dimension of the large diameter section of the through bore 11 is greater than the length of the large diameter portion of the sprue bushing 12. The sprue bushing 12 thus can be moved in a range corresponding to the difference between these lengths. The advancement of the sprue bushing 12 is restricted by a shoulder 13 between the large and small diameter sections of the through bore 11. The retreat of the sprue bushing 12 is restricted by a ring 14 fitted in the through bore 11 adjacent to the rear end thereof.

A locating ring 16 having a tapered conical through bore 15 is secured to the rear end of the stationary insert member 6. The stationary base 1 is formed with a conical through bore 17 having a greater diameter than the locating ring 16. A nozzle 19 mounted on a heating cylinder 18 extends through the through bores 17 and 15 and is in contact with the surface of a recess 12a formed in the rear end surface of the sprue bushing 12.

In FIG. 1, reference numeral 20 designates a spiral cooling groove formed in the stationary mirror surface plate 7, and numeral 21 designates a cooling water withdrawal duct communicating with the cooling groove 20. The cooling groove 20 also communicates with a cooling water drain duct (not shown). Reference numeral 22 designates a bushing 22 fitted in a portion of the through bore 11 extending to the stationary mirror surface plate 7. An end portion of the sprue bushing 12 movably penetrates the bushing 22.

The movable assembly II will now be described. On the end surface of the movable base 2 on the side of the stationary base 1 are mounted, in the mentioned order, a movable mounting member 23, a first movable member 24, an annular second movable member 25, a third movable member 26, a fourth movable member 27 having a central recess 27a and an annular movable holding member 28.

Reference numeral 29 designates ejector bars movably penetrating the movable base 2, the movable mounting member 23 and first movable member 24; numeral 30 designates a first reciprocal member which is reciprocally mounted in a notch formed in a ram 31 for moving the movable base 2; and numeral 30a a second reciprocal member which is found in a bore 25a of the second movable member 25. The ejector bars 29 are secured at one end to the first reciprocal member 30 and secured at the other end to the second reciprocal member 30a.

The first movable member 24 has a cylinder 32 in which is slidably received a piston 33 having an end in contact with a stem portion 37 of a punch 50 to be described later. The advancement of the piston 33 is limited by a stopper 34 mounted in the cylinder 32 adjacent to one open end thereof, and the retreat of the piston 33 is limited by a stopper 36 of a cover 35 secured to the movable mounting member 23 at the other end of the cylinder 32.

The piston 33 is operated as follows:

Both ends of the cylinder 32 are coupled to passages a and b, as is the 4 port 3-positional directional control valve c. The valve c is coupled to an oil hydraulic pump d and an operating fluid tank e. When solenoid GF is excited, the valve c is switched to position A. At this position, pressurized operating fluid is supplied to a retreat limit side of the piston 33, and pressurized operating fluid on an advancement limit side is discharged therefrom, whereby advancing the piston 33. When solenoid GB is excited, the 4-port 3-positional directional control valve c is switched to B position. At this position, pressurized operating fluid is supplied to the advancement limit side of the piston 33 while pressurized operating fluid on the retreat limit side is discharged therefrom, whereby retreating the piston 33 and resulting in the retreat of the punch 50.

The third movable member 26 has a central recess 39 and a through bore 40a extending from the bottom of the recess 39. The third movable member 26 also has a pair of pin holes 41 formed on the diametrically opposite sides of the recess 39. A cylindrical collar 42 is slidably fitted in each pin hole 41. A second pin 43 is slidably fitted in each collar 42. The collar 42 and second pin 43 have a length greater than the length of the pin hole 41, and they are secured at one end to the second reciprocal member 30a. The other end portion of the second pins 43 project from the pin hole 41 and is slidably received in a through hole 45 of a drive member 44 slidably fitted in a recess 27a formed in the fourth movable member 27. The second pins 43 have a large diameter portion provided at the outer end, the large diameter portion being capable of being in contact with a shoulder 45a of the through hole 45.

A movable insert member 46 and a movable mirror surface plate 47 are fitted in the annular movable holding member 28. The movable insert member 46 has a recess 46a formed on the side of the fourth movable member 27 and also has a through bore 46b extending from the bottom of the recess 46a. The movable mirror surface plate 47 has a through bore 47a having substantially the same diameter as the through bore 46b. A bushing 48 is fitted in the through bores 46b and 47a. The bushing 48 has an end portion found in the recess 46a with the end surface secured to the fourth movable member 27. Reference numeral 38 in the Figures designates a spiral cooling groove formed in the movable mirror surface plate 47. The movable holding member 28 and movable mirror surface plate 47 constitute a movable mold Y as a second mold half.

Through bores 44a and 27b are formed in a central portion of the drive member 44 and at the bottom of the recess 27a. A product ejector collar 49, which has a bore having a large diameter section and a small diameter section, has one end portion secured in the through bore 44a of the drive member 44 and the other end portion slidably extending through the through bore 27b at the bottom of the recess 27a and the bush 48.

The through bore 40a of the third movable member 26, through bore 44a of the drive member 44 and the inner bore of the product ejector collar 49 are concentric with one another and constitute a punchbore, in which a punch 50 is slidably fitted. The punch 50 has a larger diameter portion, a small diameter portion and an intermediate portion. It consists of a stem portion, large diameter portion, intermediate diameter portion and small diameter portion formed in the mentioned order. The large diameter portion is found in the recess 39. A tapered shoulder between the small and intermediate diameter portions is capable of being brought into contact with a tapered shoulder of the bore of the product ejector collar 49.

The punch 50 has a longitudinal through bore 50a, in which a ejector pin 51 is slidably fitted. The ejector pin 51 is secured at one end to the second reciprocal member 30a.

A stamper retainer 52 having an annular bore is reciprocally fitted on the outer periphery of an end portion of the bushing 48 to hold a central portion of a movable stamper 57. The stamper retainer 52 has an outwardly bent end portion which is capable of engagement with the inner periphery of the stamper 57. A stem portion of the stamper retainer 52 is formed with a thread 52a in mesh with a beveled worm gear 53. The beveled worm gear 53 is cylindrical, and its inner periphery is screwed on an increased diameter stem portion of the bush 48. The gear 53 has a threaded end portion which is in mesh with a screw rod 54 rotatably supported in the movable holding member 28. With rotation of the screw rod 54, the gear 53 is rotated to cause advancement or retreat of the stamper retainer 52.

Reference numeral 55 designates a spring provided between the large diameter portion of the punch 50 and the bottom of the third movable member 26. It biases the punch 50 toward the right in the Figures. Reference numeral 56 designates a spring provided between the second reciprocal member 30a and the fourth movable member 27. It biases the second reciprocal member 30a toward the right.

The movable stamper 57 is mounted on the face of the movable mirror surface plate 47, and it has a central opening. An outer stamper retainer 58 is mounted by bolts 59 on the outer periphery of the movable mirror surface plate 47 to secure the movable mirror surfaces plate 47 to the outer periphery of the movable stamper 57.

Figure 2:
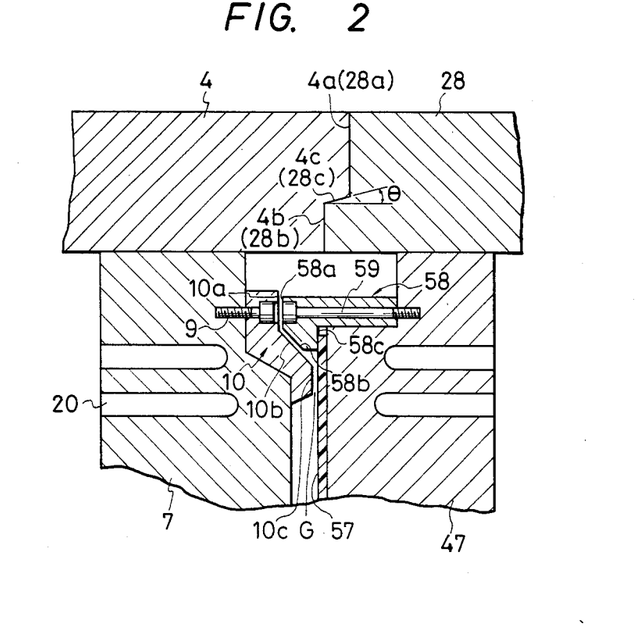
FIG. 2 is a sectional view showing an essential part of the embodiment of the invention.

The outer stamper retainer 58, as shown in FIG. 2, is constituted by an annular member disposed on the outer periphery of the movable mirror surface plate 47. Its end facing the stationary mirror surface plate 7 consists of a radial surface 58a parallel to the diametrical direction of the movable mirror surface plate 47, an inclined surface 58b extending from the radial surface 58a in an inclined direction toward the movable stamper 57 and a holding face 58c for retaining the movable stamper 57. Between the holding face 58c and the movable stamper 57 is provided a slight gap. The gap is formed greater than the thickness of said stamper to permit the stamper to expand radially under heating.

The end of the outer ring 10, which is provided at a position corresponding to the outer stamper retainer 58, on the side of the outer stamper retainer 58 consists of an outer radial surface 10a, which is parallel to the radial surface 58a of the outer stamper retainer 58, an inclined surface 10b, which extends from the radial surface 10a and is parallel to the inclined surface 58b of the outer stamper retainer 58, and an inner radial surface 10c, which extends from the inclined surface 10b and is parallel to the stamper 57. When the mold halves are clamped, an air purging gap is formed between the radial surfaces 10a and 58a, between the inclined surface 10b and 58b and between the inner radial surface 10c and stamper 57. Numerically, the gap G between the inner radial surface 10c and stamper 57 is set to approximately 10 μm, and the diametrical dimension of the inner radial surface 10c is set to approximately 3 mm. These numerical values are determined from considerations to prevent the out-flow of molten resin from the gap G at the time of the injection and also facilitate the out-flow of air at the time of the injection.

When the mold halves are clamped, the stationary and movable holding member 4 and 28 are brought into contact with each other such as to form an air purging gap between the outer ring 10 and outer stamper retainer 58. Thus, the sum of the lengths in the movement direction (i.e., axial dimensions) of the stationary and movable holding mebers 4 and 28, is set such that the outer ring 10 and outer stamper retainer 58 are not in contact with each other, that is, an air purging gap is formed betewen the two members, at the time of the clamping of the mold halves. In other words, the force applied to clamp the mold halves is received by the movable and stationary holding members 28 and 4.

Where the force for clamping the mold halves is supported by the movable and stationary holding members 28 and 4 in this way, the opposed end surfaces of the members 28 and 4 have to be brought into contact with each other such that the stationary and movable mirror surface plates 7 and 47 are accurately concentric with each other at the time of the clamping of the mold halves. In other words, the members 28 and 4 should not deviate transversely with respect to each other when they are brought into contact with each other. Accordingly, the opposed end surfaces of the stationary and movable mirror surface plates 7 and 47 have inclined portions.

More specifically, the opposed end of the stationary holding member 4 consists of upper and lower radial surface 4a and 4b perpendicular to the direction of movement of the movable holding member 28 and an inclined surface 4c extending between the radial surfaces 4a and 4b and inclined inwardly in the direction away from the movable holding member 28. The opposed end of the movable holding member 28 also has upper and lower radial surfaces 28a and 28b and an inclined surface 28c between the radial surfaces 28a and 28b. The radial surfaces 28a and 28b and inclined surface 28c are parallel with the radial surfaces 4a and 4b and inclined surface 4c of the stationary holding member 4, respectively, The inclination angle $\theta$ of the inclined surface 4c is set to be in a range or 4° to 10°, preferably 7°, with respect to the direction of movement of the movable holding member 28. With this configuration of the opposed ends of the stationary and movable holding members 4 and 28, these members 4 and 28 are guided by the inclined surfaces 4c and 28c when they are moved relative to each other when clamping the mold halves. Thus, they are never deviated from each other when they are brought into contact with each other. If the inclination angle of the inclined surface 4c is too large, the guide function is deteriorated. If the angle is too small, on the other hand, it is liable that smooth relative movement of the inclined surfaces 4c and 28c cannot be obtained due to their mutual interference. The above inclination angle range is free from these problems.

The operation of the sprue bushing 12 will not be described. According to the invention, a central aperture is formed in the molding by the punch 50 while the molding is in close contact with the parting surface of the mold cavity. Therefore, the sprue bushing 12 is movable and retreated with advancement of the punch 50. According to the invention, however, the sprue bushing 12 is not retreated without generation of resistance, but it is retreated while applying a force against the urging force of the punch 50 being advanced. More specifically, while the nozzle 19 is conventionally retreated immediately after completion of the injection of molten resin, according to the invention the nozzle 19 is not retreated but is held in contact with the surface of the recess 12a of the sprue bushing 12 after completion of the injection, thus reducing the contact force. An urging force is given to the sprue bushing 12 by the contact of the nozzle 19 with the surface of the recess 12a. The urging force may be fixed or varied step-wise or slope-wise as is discussed further below.

A specific mechanism for causing the above operation of the nozzle 19 will now be described. As shown in FIG. 1, the nozzle 19 is mounted on an end of a heating cylinder 18 which is secured to a connecting unit 60. The connecting unit 60 is coupled to a piston rod 61a of an oil hydraulic cylinder 61 and is reciprocable. The oil hydraulic cylinder 61 has ports 62 and 63 formed at the opposite ends. A passage 65a is led from the port 62 of the cylinder 61 on an advancement limit side, and a pasage 65b is led from the port 63 on a retreat limit side. The passages 65a and 65b are coupled to a 4-port 3-position directional control valve 67, which is in turn coupled to an oil hydraulic pump 64 and an operating fluid tank 66. A branch passage 68 led to the operating fluid tank 66 is connected to the passage 65b between the port 63 and 4-port 3-position directional control valve 67. An electromagnetic proportional pressure control valve 69 is provided on the branch passage 68. The 4-port 3-position directional control valve 67, normally closed, is switched into the on positions with excitation of solenoids 67a and 67b. When the solenoid 67a is excited, the valve 67 is switched to assume a position A. At this position of the valve, pressurized operating fluid is supplied to the chamber on the advancement limit side of the piston rod 61a and discharged from the chamber on the retreat limit side. The nozzle 19 is thus retreated. When the solenoid 67b is excited, the 4-port 3-position directional control valve 67 is switched to a position B. At this time, fluid is applied to the chamber on the retreat limit side of the piston rod 61a and discharged from the chamber on the advancement limit side. The nozzle 19 is thus advanced.

Since the electromagnetic proportional pressure control valve 69 is provided on the branch passage 68 of the oil hydraulic circuit described above, the force given to the sprue bushing 12 can be adjusted appropriately by determining the preset pressure of the valve 69. The urging force may be adjusted to vary step-wise or slope-wise.

While the force given to the sprue bushing 12 is adjustable with the electromagnetic proportional pressure control valve 69, this is by no means limitative, and it is possible to use a reducing valve.

Under the above explanation, the nozzle 19 is utilized as a means for imparting resisting force to the sprue bushing 12. However, the present invention is not limited thereto. For example, when the sprue bushing 12 is in a state of retreat, the sprue bushing 12 may be applied resisting force by the generation of backing pressure by increasing oil hydraulic pressure of an oil hydraulic system supporting the sprue bushing 12 through restriction.

Reference numeral 70 designates threaded rods mounted on a clamping cylinder (not shown). The first reciprocal member 30 is brought into engagement with the threaded rods 70 when opening the mold halves.

Figure 5:
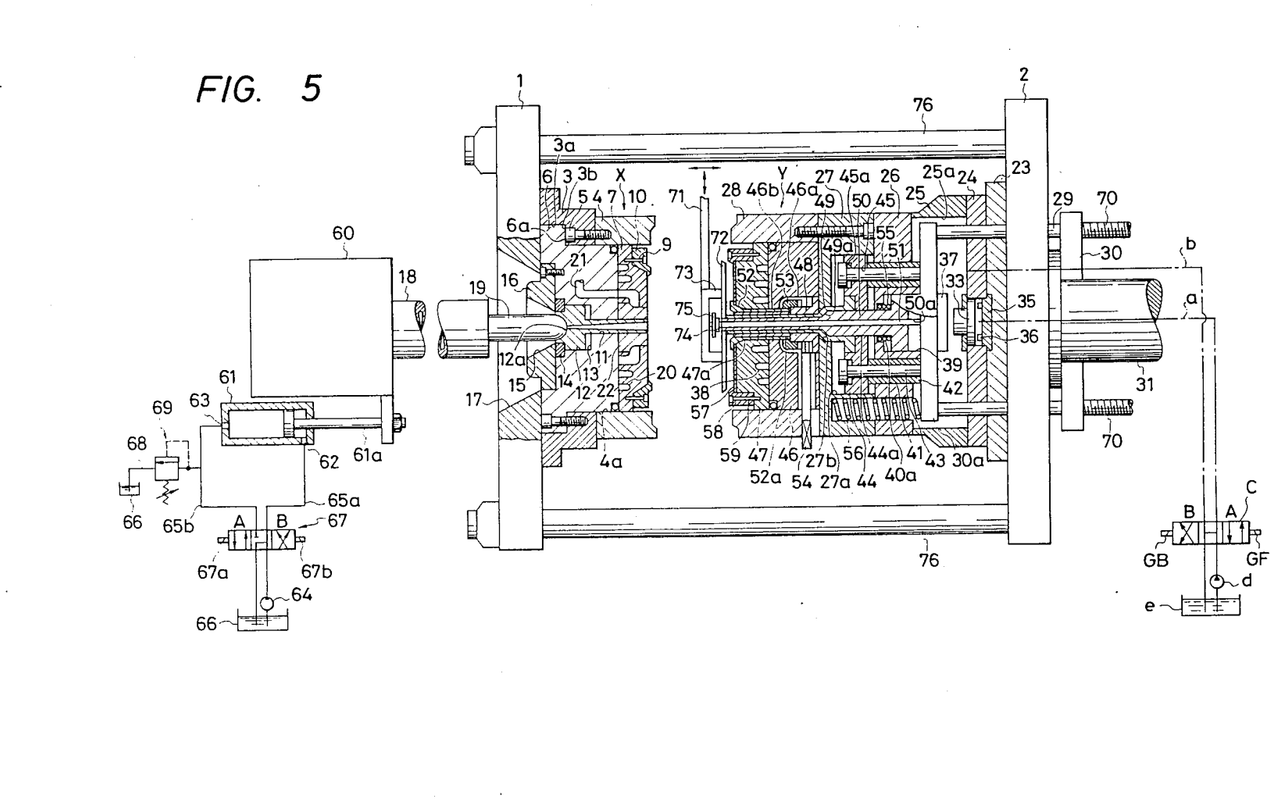
FIG. 5 is a view similar to FIG. 1 but showing the molding apparatus in a state for taking out a product.

Referring to FIG. 5, reference numeral 71 designates a product take-out arm. The product take-out arm 71 has a disc suction board 73 for attracting by suction a product disc 72 and removed piece suction board 75 for attracting by suction a removed piece 74 separated from the product disc 72. When the mold halves are opened, the product take-out arm 71 is lowered from above the mold halves to a predetermined position, and after attracting the product disc 72 and removed piece 74 having a sprue, it is raised back. Reference numeral 76 designates a stay, which is secured to the stationary base and slidably penetrates the movable base 2.

Now, the operation of the above construction will be described. When the ram 31 for clamping the mold halves is driven by a clamping cylinder (not shown) to be advanced to the left in the Figures, the movable holding member 28 approaches the stationary holding member 4, and the inclined surface 28c of the movable holding member 28 is moved into frictional contact with the inclined surface 4c of the stationary molding member 4. In other words, the movable holding member 28 approaches the stationary holding member 4 while being guided by the inclined surfaces 4c and 28c. Eventually, the radial surfaces 28a and 28b of the movable holding member 28 are brought into contact with the radial surfaces 4a and 4b of the stationary holding member 4, whereupon the movable holding member 28 is stopped to complete the clamping of the mold halves.

Since the length dimensions of the stationary and movable holding members 4 and 28 are set as described before, in the state of completion of the clamping of the mold halves, air purging gaps are formed as shown in FIG. 2 between the outer ring 10 and outer stamper retainer 58 and between the outer ring 10 and movable stamper 57.

When the stationary and movable mirror surface plates 7 and 47 are closed in this way, the pressure in the clamping cylinder (not shown) is boosted up to a predetermined pressure, and then the heating cylinder 18 is advanced to bring the end of the nozzle 19 into contact with the recess 12a of the sprue bushing 12. In this state, molten resin in the heating cylnder 18 is injected into the mold cavity. This state is shown in FIG. 1.

Figure 3:
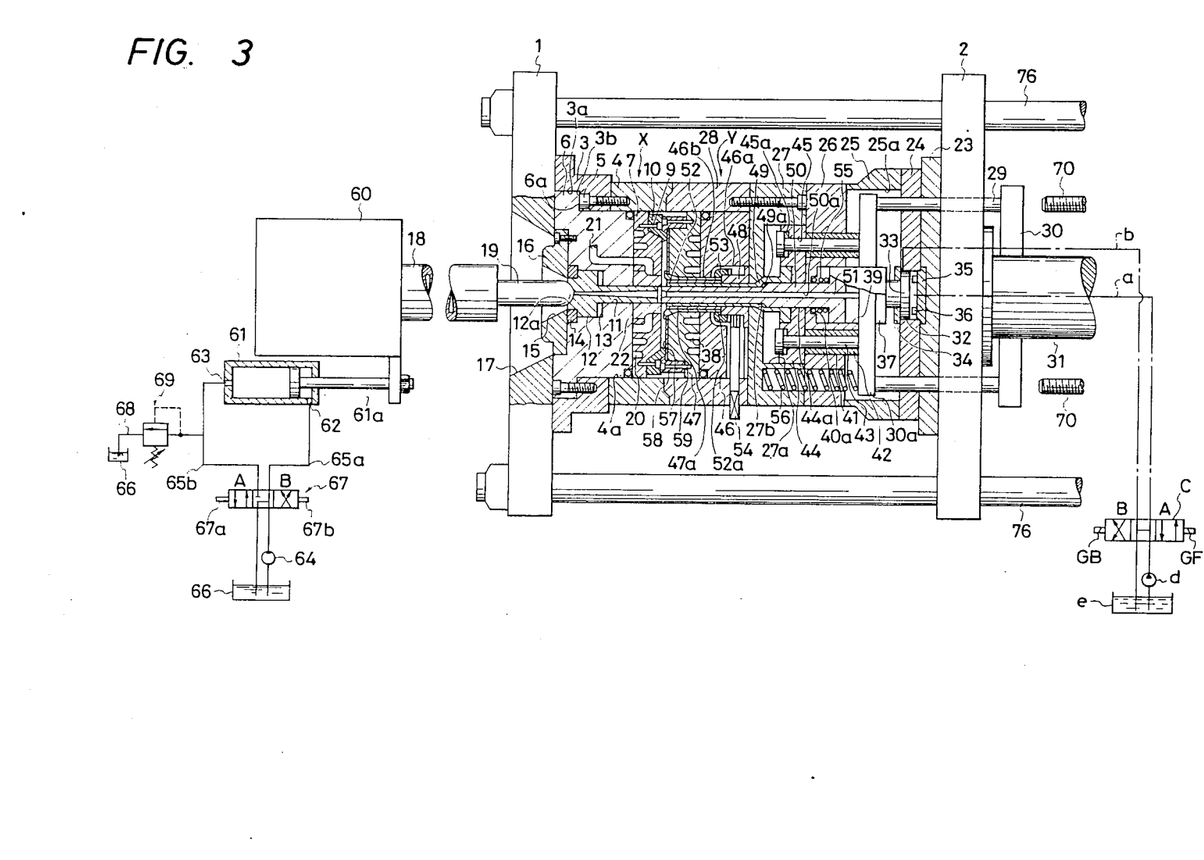
FIG. 3 is a view similar to FIG. 1 but showing the molding apparatus with a punch in an advanced state.

When the injection of molten resin is completed, the injected molten resin in the mold cavity is held under an appropriate pressure applied to it for a predetermined period of time. Then, the 4-port 3-position directional control valve 67 is switched over to the position A, and the pressure of contact of the nozzle 19 with respect to the sprue bushing 12 is controlled with the electromagnetic proportional pressure control valve 69. At the same time, the cylinder 32 provided on the first movable member 24 is operated to cause movement of the piston 33 to the left, and hence movement of the punch 50 to the left (see FIG. 3). With this movement of the punch 50 the molded disc is punched so that the central aperture is formed in it. At this time, the sprue bushing 12, which is capable of retreat, starts to be retreated with the advancement of the punch 50. However, the nozzle 19 remains in contact with the surface of the recess 12a of the sprue bushing 12, and a force resisting the urging force of the punch 50 is being applied to the nozzle 19 by the electromagnetic propotional pressure control valve 69. Therefore, although the sprue bushing 12 is retreated with the advancement of the punch 50, the urging force of the punch 50 can be adjusted since a force, which resists the urging force of the punch 50 and can be freely adjustable, is applied to the sprue bushing 12. In the absence of a force resisting the urging force of the punch 50 applied to the sprue bushing 12, no substantial resistance is offered to the retreat of the sprue bushing 12 with the advancement of the punch 50. In this case, however, a coarse cutting surface of the aperture of the molded disc results, and residual stress is generated. Consequently, the signal recording range in the reighborhood of the central aperture is reduced.

Figure 4:
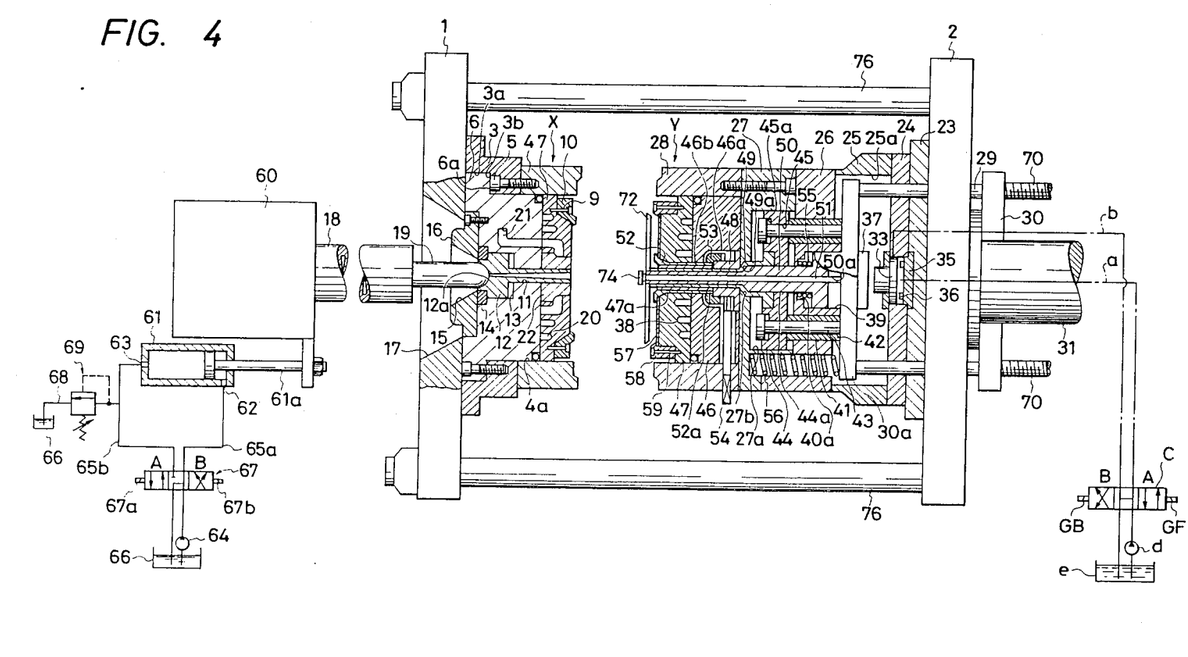
FIG. 4 is a view similar to FIG. 1 but showing the molding apparatus in an open state.

When the punching of the molded disc has been effected in the above way, the movable base 2 starts to be retreated. With this retreat, the first reciprocal member 30 is also retreated. When the first reciprocal member 30 is retreated to a certain extent, it strikes the pair of threaded rods 70 and is stopped. Meanwhile, the movable base 2 is continually retreated after the first reciprocal member 30 has been stopped. In consequence, the ejector pin 51 secured to the second reciprocal member 30a is relatively projected via the ejector bars 29, so that the removed piece 74 resulting from the punching by the punch 50 is ejected, as shown in FIG. 4.

With further retreat of the movable base 2, relative movement of the drive member 44 to the left is affected via collars 42 secured to second reciprocal member 30a. Thus, the project ejector collar 42 is relatively projected. In consequence, the product disc is separated from the movable mirror surface plate 47 by the collar 49, as shown in FIG. 5.

Figure 9:
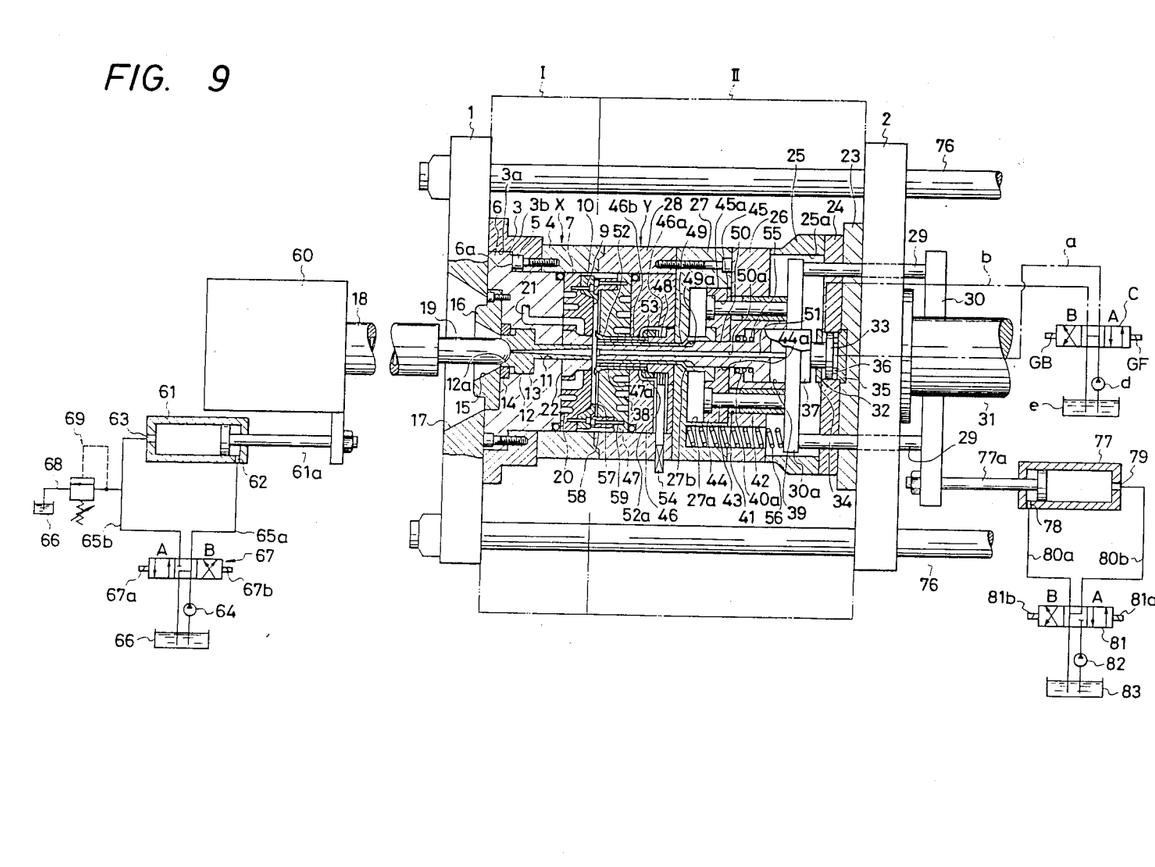
FIG. 9 is a sectional view showing another different embodiment of the invention.

In the above, the ejection of the ejector pin 51 is carried out by striking the first reciprocal member 30 to the threaded rods 70. However, the ejection of the ejector pin 51 may be made by another manner. That is, as shown in FIG. 9, it is possible to advance the first reciprocal member 30 by using an oil hydrulic cylinder 77. In other words, as shown in FIG. 9, the advancement and retreat of the first reciprocal member 30 can be conducted by securing one end of a piston rod 77a to the first reciprocal member 30.

Next, the oil pressure circuit which actuates the oil hydraulic cylinder 77 is explained. In FIG. 9, reference numerals 78, 79 designate ports formed at the both ends of the oil hydraulic cylinder 77. A passage 80a is led from the port 78 of the cylinder 77 on an advancement limit side, and a passage 80b is led from the port 79 on a retreat limit side. The passages 80a, 80b are coupled to a 4-port 3-position directional control valve 81, which is in turn coupled to an oil hydraulic pump 82 and an operating fluid tank 83.

The position of the 4-port 3-position directional control valve 81 is determined by exciting solenoids 81a, 81b, When the solenoid 81a, for example, is excited, the 4-port 3-position directional control valve 81 is switched to a position A. At this position of the valve 81, pressurized operating fluid is supplied to the retreat limit side of the piston rod 79a and pressurized operating fluid on the advancement limit side is discharged, so that the first reciprocal member 30 advances. When the solenoid 81b is excited, the 4-port 3-positional directional control valve 81 is switched to B position. At this time, pressurized operating fluid is supplied to the advancement limit side of the piston rod 81a and pressurized operating fluid is discharged from the retreat limit side of the piston rod 81a, resulting in the retreat of the first reciprocal member 30. As mentioned above, when the first reciprocal member 30 advances, the ejector pin 51 is ejected in the similar manner mentioned above. When the first reciprocal member 30 is further advanced, the collar 42 causes the drive member 44 to move toward the left. When a molded disc 74 is taken out as mentioned below, the solenoid 81b is excited to retreat the first reciprocal member 30.

Subsequently, the product take-out arm 71 is lowered, and the product disc 72 and removed piece 74 are attracted to the disc suction board 73 and removed piece suction board 75, respectively, as shown in FIG. 5. Afterwards, the product take-out arm 71 is moved to the left and then raised, whereby the product disc and removed piece are transported to a predetermined position.

Figure 6:
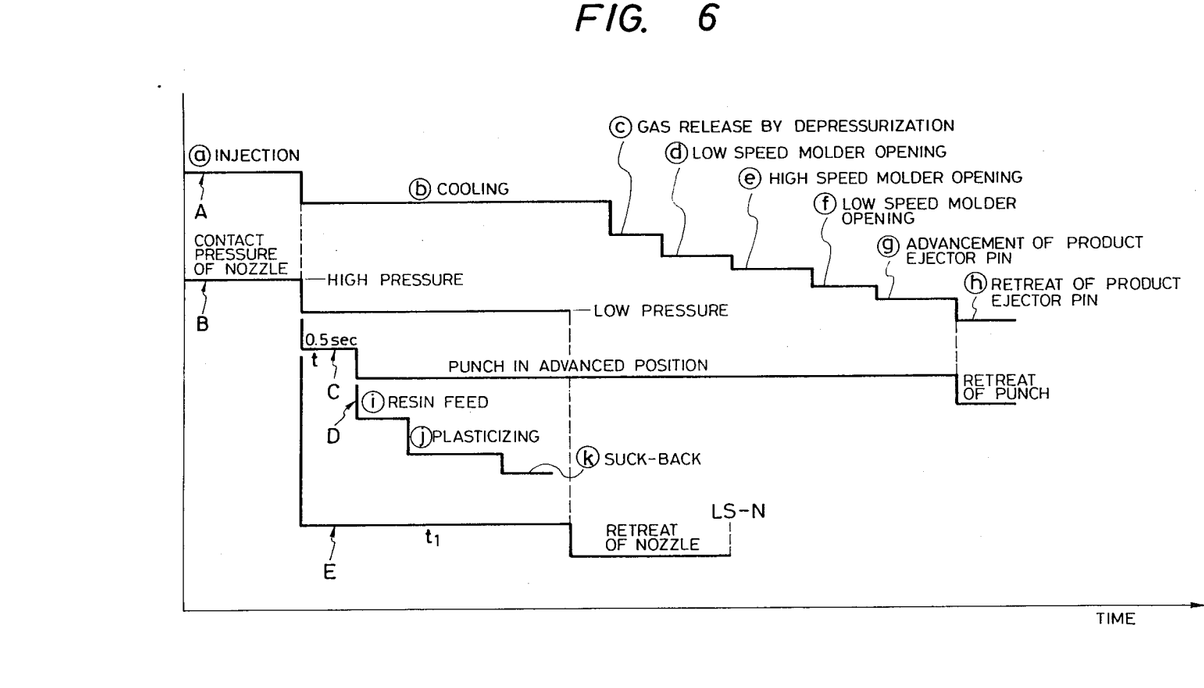
FIG. 6 is a time chart illustrating the operation of the molding apparatus according to the invention.

FIG. 6 schematically shows in a time chart the operation described above according to the invention. The operation consists of an injection step a, a molding cooling step b, a gas release by depressurization step c, a low speed molder opening step d, a high speed molder opening step e, a low speed molder opening step f, an ejector pin advancement step g and an ejector pin retreat step h, these steps being executed in the mentioned order is shown by a line A.

The contact pressure P of the nozzle 19 with respect to the sprue bushing 12 is shown by a line B. As is shown, the contact pressure is set at a high pressure until completion of the injection and set to a low pressure after completion of the injection.

A line C shows the operation of the punch 50. As is shown, the punch 50 is advanced after the lapse of time (t) from completion of the injection. This time (t) is preferably 0.5 second but may be varied depending on the resin material being molded. It is to be noted that according to the invention the punching by the punch 50 is effected very shortly after completion of the injection, at which time the molding has not yet been hardened by cooling. Therefore, it is possible to obtain a smooth cut surface of the aperture of the product. In addition, no cutting dust is produced and attached to the surface of the stamper 57 or the face of the stationary mirror surface plate 4. Thus, there is no possibility of formation of defective molding due to otherwise possible introduction of cutting dust at the time of the next injection.

The punch 50 is retreated simultaneously with the start of retreat of the ejector pins 29.

A line D shows the charging process. As is shown, it consists of a resin feed step i, a plasticization step j and a suck-back step k, these steps being executed in the mentioned order. A line E shows the operation of the nozzle 19. During a period t from the completion of the injection till the completion of the punching by the punch 50, the nozzle 19 is in contact with the sprue bushing 12 under a low pressure (i.e., in the presence of an applied force in the direction resisting the urging force of the punch). After the completion of the punching, the nozzle 19 is retreated until it strikes a limit switch LS-N.

It will be seen from FIG. 6 that mold opening steps d, e and f are effected with the punch 50 in the advanced state. Thus, the punch 50 after the punching never passes through the aperture of the product again, so that it never causes a damage to the cut surface or generates cutting dust.

Figure 7:
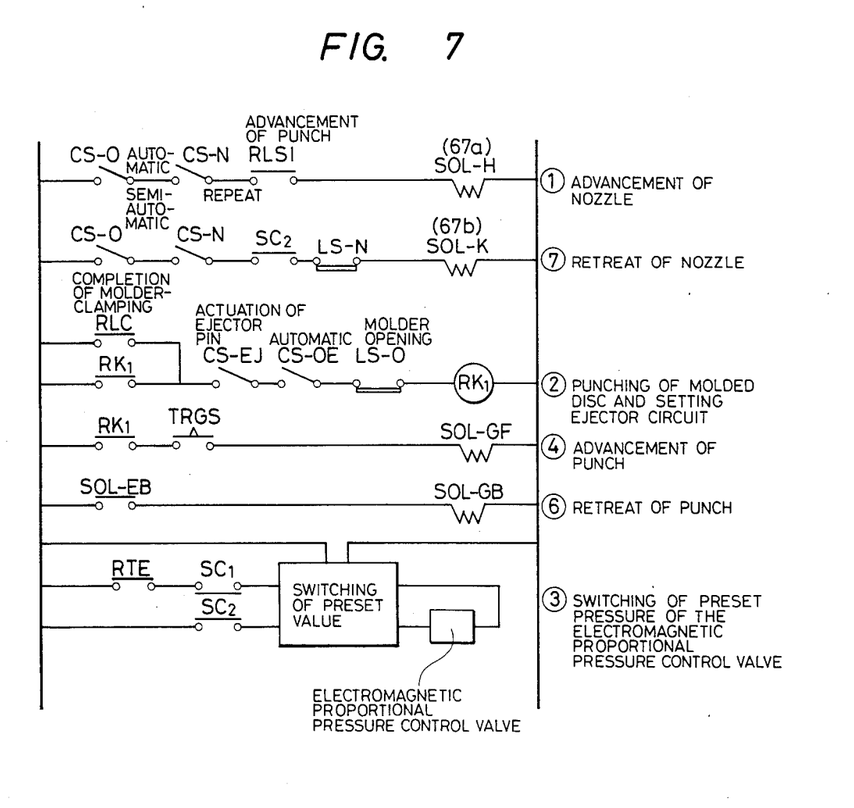
FIG. 7 is a schematic sequence diagram showing the operation of the molding apparatus according to the invention.

FIG. 7 shows a further embodiment of the present invention. In this embodiment, the apparatus in the preceding embodiment is used, but it is arranged that after the completion of the injection, the punch is actuated by the control of the timer to punch a central aperture in a molded disc before the molten resin in the molder cavity has been solidified.

Specifically, FIG. 7 schematically shows a sequence of an injection molding process according to a further embodiment of the invention concerned primarily with the operation of the punch 50. The illustrated process sequence includes advancement of the nozzle 19, retreat thereof, setting of the molded disc punching and ejector circuit, advancement of punch, retreat thereof and switch of the preset pressure of the electromagnetic proportional pressure control valve.

(1) Advancement of the nozzle - When a mold halves-clamping start signal is supplied after the switching of a selector switch CS-O to auto or semi-auto, switching of a selector switch CS-N to repeat and closing the selector switches CS-O and CS-N, a relay RLSI is excited to excite a solenoid SOL-H (i.e., solenoid 67a ). Thus, in step 1, the 4-port 3-position directional control valve 67 is switched to the position B so that pressurized operating fluid is supplied to the chamber on the retreat limit side of the piston rod 61a and discharged from the chamber on the advancement limit side. Thus, the nozzle 19 is advanced under high pressure (The switch CS-O becomes "auto" when for example a selector switch is turned in a clockwise direction. It is semi-auto when the selector switch is at a neutral position, and the switch may be manually operated when turned to a counterclockwise position. The switch CS-N has a position selection arrangement similar to switch CS-O. When in a neutral, repeat position, the switch operates to repeat the advancement and retreat of the nozzle 19).

(2) Setting of molded disc punching and ejector circuit—When a mold halves-clamping completion signal is supplied to a relay RLC, the relay RLC is excited to close contacts RLC. At the same time, the injection is started to fill the mold cavity with the molten resin. If closure of a selector switch CS-EJ, switching of selector switch CS-OE to auto and closure of a normally-open switch LS-O are effected after completion of the injection, a relay coil RK1 is excited. The relay switch RK1 is in parallel with relay RLC to self-sustain the excited state, that is, the circuit for the molded disc punching ejector circuit is set.

(3) Switch of preset pressure of the electromagnetic proportional pressure control valve—When the injection is complete, a relay RTE is excited. Since a relay switch SC1 is normally closed, the preset pressure of the electromagnetic proportional pressure control valve 69 is switched from a high pressure over to a low pressure. The preset pressure may be provided in a desired mode (e.g., it may be fixed or may be variable continuously or step-wise).

(4) Advancement of punch—When the injection is completed, the switch RK1 is closed as noted above. At the same time, a timer starts time counting. When the time counting is over, a timer switch TRGS is closed to cause excitation of a solenoid SOL-GF. The punch 50 is thus advanced to effect punching of the molded disc. In this connection, it is desirable for the timer to start time counting 0.1-0.5 seconds after the molten resin is injected. After this time, the molten resin will not be solidified.

(5) Opening of molder—When the stamping by the punch 50 is completed, the mold halves start to be opened. Subsequently, the removed piece 74 is ejected by the ejector pins 29, and the product disc 72 is separated from the molder cavity wall by the product ejector collar 49.

(6) Retreat of punch 50—When the separation of the product disc 72 is completed, a signal is supplied to a solenoid SOL-GB to excite this solenoid SOL-GB. As a result, the punch 50 is retreated.

(7) Retreat of nozzle 19—After the injection a charging process is started, a screw in the heating cylinder 18 is retreated while being rotated. When the screw is stopped, a normally-open relay switch SC2 is closed, and also selector switches CS-O and CS-N are closed. As a result, a solenoid K (i.e., solenoid 67b) is excited. When the nozzle reaches a limit of retreat, a limit switch LSN is actuated to stop the nozzle. At the same time, the relay switch SC1 is closed. Since a relay switch SC2 is normally-open, the preset pressure of the electromagnetic proportional pressure control valve 69 is switched over to the high pressure.

Figure 8:
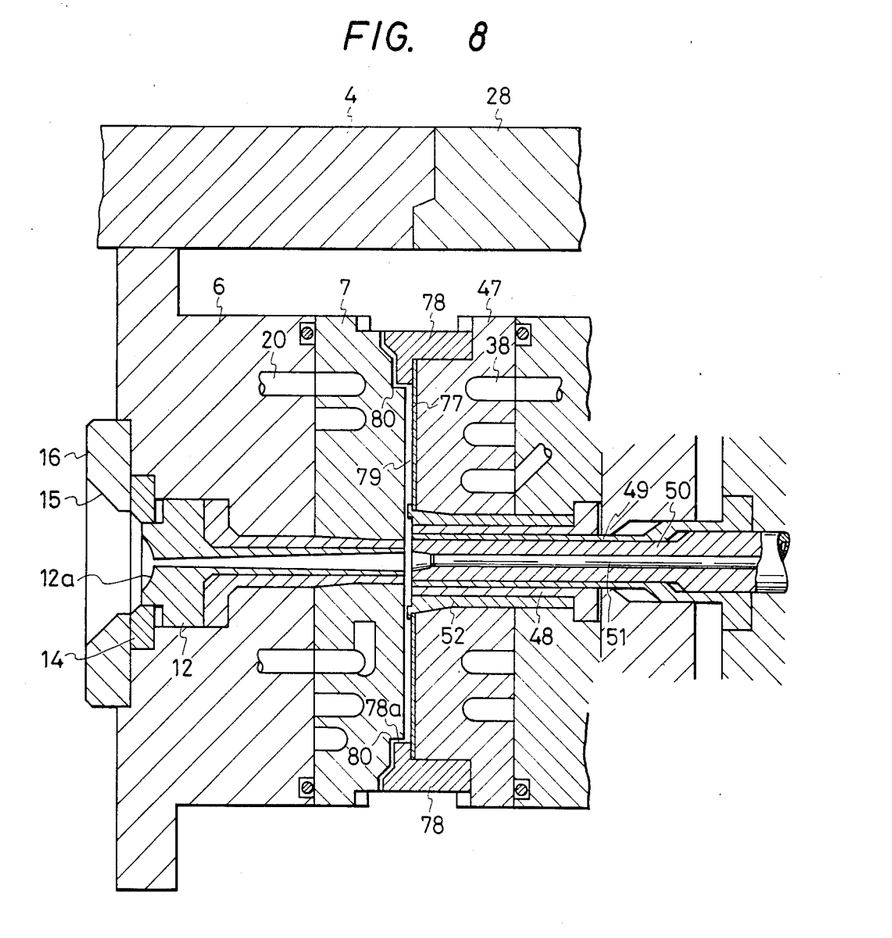
FIG. 8 is a sectional view showing a different embodiment of the invention.

FIG. 8 shows a different embodiment of the invention. The illustrated mold halves are for performing an injection compression molding. In the Figure, reference numerals like those in FIG. 1 designate like or corresponding parts. Referring to the figure, reference numeral 77 designates an annular stamper, and numeral 78 an outer stamper retainer, which is secured to the outer periphery of the annular stamper 77. The inner periphery of the stamper retainer 78 defines an annular cavity 79.

Reference numeral 80 designates an annular and side face of the stationary mirror surface plate 7, which is positioned opposite to the inner periphery 78a of the outer stamper retainer 78, with a slight gap therebetween.

The above structure of the molder permits injection compression molding. More specifically, for injection of molten resin into the annular cavity after clamping the mold halves and holding a constant mold clamping force, the constant mold clamping force is set to be slightly lower than the force corresponding to the product of the pressure of the injected molten resin and an area of projection of a shape, into which the injected molten resin spreads circularly in the annular cavity 79. In this case, the molder halves are slightly opened at the time of the injection to reduce force acting on the molten resin. Consequently, the thickness dimension of the annular cavity 79 of the mold halves is increased. However, the molten resin will never get out of the annular cavity 79 owing to a relative movement of the inner periphery 78a of the outer stamper retainer 78 and the annular and stepped side face 80 of the stationary mirror surface plate 7. When the injection is completed, the pressure of the molten resin becomes zero, so that the mold halves are clamped again by the mold clamping force. The molten resin in the annular cavity 79 is confined under a uniform pressure distribution in the annular cavity 79, so that it is possible to obtain a molding product with less birefringence. The apparatus shown in FIG. 8 can be, of course, used in cases that the sprue bushing is retreated with the advancement of the punch while imparting resisting force to the sprue bushing or that the punch is driven by use of a timer.

What is claimed is:

1. A molding apparatus for producing discs having a central aperture comprising:

(a) a stationary base;
 (b) a movable base provided so as to reciprocatively move with respect to the stationary base;
 (c) a first mold half fixed to the stationary base;
 (d) a second mold half fixed to the movable base;
 (e) a cavity defined between the first mold half and the second mold half when both said mold halves are at a closed position, for forming a disc;
 (f) a stamper provided on a face of one of the mold halves;
 (g) a sprue bushing movably provided in the first mold half and having a passage for molten resin, said passage communicating with a center portion of the cavity;
 (h) a nozzle for injecting molten resin through the passage of the sprue bushing into the cavity;
 (i) a reciprocatively movable punch provided in the second mold half at a position corresponding to the sprue bushing, so as to go through the center portion of the cavity; and (j) means for applying a force to the sprue bushing resisting an urging force of the punch at a time when the sprue bushing retreats during punching out of the center of a molded disc in the cavity by the punch.

2. A molding apparatus as claimed in claim 1, wherein said means comprises an oil hydraulic cylinder for applying to the sprue bushing a force resisting the urging force of the punch.

3. A molding apparatus as claimed in claim 1, wherein said means comprises an oil hydraulic cylinder for applying to the nozzle a force resisting the urging force of the punch.

4. A molding apparatus as claimed in claim 1, wherein said means for applying resisting force comprises:
a heating cylinder provided on a rear end of the nozzle;
an oil hydraulic cylinder for moving the heating cylinder together with said nozzle forward and backward; and
an oil hydraulic pressure circuit connected with the oil hydraulic cylinder and equipped with a control valve for adjusting the resisting force applied to the sprue bushing.

5. A molding apparatus claimed in claim 1, wherein a gap communicating with the outer periphery of the cavity is defined between the first mold half and the second mold half when said mold halves are in said closed position.

6. A molding apparatus as claimed in claim 1, wherein the reciprocatively movable punch is connected to a timer such as to actuate the punch after a predetermined period of time after molten resin is injected into the cavity.

7. A molding apparatus as claimed in claim 6, wherein said timer is adapted to actuate the reciprocatively movable punch after the molten resin is injected and before the molten resin is solidified.

8. A molding apparatus for producing discs having a central aperture comprising:
(a) a stationary base;
(b) a movable base provided so as to reciprocatively move with respect to the stationary base;
(c) a first mold half fixed to the stationary base;
(d) a second mold half fixed to the movable base;
(e) a cavity defined between the first mold half and the second mold half when both said mold halves are at a closed position, for forming a record disc;
(f) a stamper provided on a face of one of the mold halves;
(g) a sprue bushing movably provided in the first mold half and having a passage for molten resin, said passage communicating with a center portion of the cavity;
(h) a nozzle for injecting molten resin through the passage of the sprue bushing into the cavity;
(i) a reciprocatively movable punch provided in the second mold half at a position corresponding to the sprue bushing, so as to go through the center portion of the cavity; and
(j) a timer for counting a predetermined period of time after the injection of molten resin and before the molten resin is solidified, said timer imparting a signal so as to actuate the punch after the predetermined time.

* * * * *